(12) United States Patent
Hayashi

(10) Patent No.: US 7,901,738 B2
(45) Date of Patent: Mar. 8, 2011

(54) METHOD FOR FORMING ELECTRODE FOR BATTERY

(75) Inventor: Tetsuya Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1072 days.

(21) Appl. No.: 11/700,132

(22) Filed: Jan. 31, 2007

(65) Prior Publication Data

US 2007/0231468 A1    Oct. 4, 2007

(30) Foreign Application Priority Data

Mar. 30, 2006  (JP) ................................ 2006-094004

(51) Int. Cl.
*B05D 5/12* (2006.01)
*B05D 1/28* (2006.01)

(52) U.S. Cl. ..... 427/359; 427/98.4; 427/355; 427/372.2; 427/428.06

(58) Field of Classification Search ................ 427/58, 427/98.4, 355, 359, 372.2, 428.06; 118/244
See application file for complete search history.

(56) References Cited

FOREIGN PATENT DOCUMENTS

| JP | 04064487 A | * | 2/1992 |
| JP | 05329417 A | * | 12/1993 |
| JP | 11-5052 | | 1/1999 |
| JP | 11-005052 | * | 12/1999 |

* cited by examiner

*Primary Examiner* — Brian K Talbot
(74) *Attorney, Agent, or Firm* — McDermott Will & Emery LLP

(57) ABSTRACT

A method for forming an electrode for a battery includes the step of forming a porous layer on the surface of an electrode hoop formed at its surface with a mixture layer containing an active material. The porous layer is formed in the following manner: A gravure roll is rotated oppositely to the direction of movement of the electrode hoop while being allowed to abut against the surface of the moving electrode hoop, thereby applying a coating fluid serving as a precursor of the porous layer to the surface of the electrode hoop. A plurality of grooves formed in the circumferential surface of the gravure roll extend in parallel in oblique directions against the rotation direction of the gravure roll from the central line of the circumferential surface to the outer edges of the circumferential surface so as to be arranged in a symmetrical manner relative to the central line.

3 Claims, 3 Drawing Sheets

|  | Angle of inclination of groove 7a(°) | Average thickness of thin part($\mu$m) | Range of variation in thickness of thin part($\sigma$) |
|---|---|---|---|
| Example 1 | 45 | 4.2 | 0.3 |
| Example 2 | 45 | 4.0 | 0.4 |
| Example 3 | 0.05 | 3.7 | 0.5 |
| Example 4 | 10 | 3.6 | 0.4 |
| Example 5 | 20 | 3.4 | 0.4 |
| Comparative Example 1 | 0 | 3.8 | 0.7 |
| Comparative Example 2 | 45 | 1.3 | 0.3 |

METHOD FOR FORMING ELECTRODE FOR BATTERY

CROSS-REFERENCE TO RELATED APPLICATIONS

The disclosure of Japanese Patent Application No. 2006-094004 filed on Mar. 30, 2006 including specification, drawings and claims is incorporated herein by reference in its entirety.

BACKGROUND OF THE INVENTION (1) Field of the Invention

The present invention relates to methods for forming porous layers on the outer surfaces of electrode hoops of nonaqueous electrolyte secondary batteries or other batteries.

(2) Description of Related Art

As portable electronic devices and cordless electronic devices have come to be more widely used, expectations are growing for lightweight nonaqueous electrolyte secondary batteries with high energy density. However, an active material of such a nonaqueous electrolyte secondary battery is made of highly reactive lithium, and therefore a short circuit between a positive electrode and a negative electrode under abnormal conditions generates heat. Due to the generated heat, a resinoid microporous membrane separator for isolating the positive electrode from the negative electrode melts around the area in which the electrodes are short-circuited, thereby increasing the area in which the electrodes are short-circuited and thus generating abnormal superheat. In order to prevent this, a technique is being used in which, in case of the occurrence of a short circuit between electrodes, superheat due to an increase in the area where the electrodes are short-circuited is suppressed by combining a porous refractory layer having a refractory resin or an inorganic oxide as the main ingredient with the resinoid microporous membrane separator.

Such a porous refractory layer is formed on the outer surface of a positive electrode or a negative electrode (hereinafter, referred to as an "electrode") without loss of the design capacity of a battery to have a thickness of 2 through 10 µm. A method in which a coating fluid serving as a precursor of a porous refractory layer is transferred to a gravure roll provided with a plurality of grooves and the transferred coating fluid is applied to the outer surface of a target electrode hoop (hereinafter, referred to as "gravure method") is preferably employed as a method for forming a layer of a thickness as described above with high accuracy. The electrode hoop formed at its outer surface with a porous refractory layer is then cut into pieces each having a necessary size, and the resultant pieces are utilized as electrodes for batteries.

In order to realize the gravure method, the following two techniques are effective. One of the techniques is that the direction in which an electrode hoop travels is allowed to become opposite to the direction of rotation of a gravure roll. In this way, a thin coating membrane can be formed on the outer surface of an object to be coated with a coating fluid with high accuracy. The other one of the techniques is that a plurality of grooves are formed in the circumferential surface of a gravure roll to extend downward from one outer edge of the circumferential surface to the other outer edge and generally in parallel. This method allows a coating fluid to be uniformly spread out over the outer surface of an object to be coated with the coating fluid. Therefore, a thin coating membrane can be formed with higher accuracy.

FIG. 6 is a schematic view partially illustrating the state in which a porous refractory layer is formed using a known gravure roll. In FIG. 6, the circumferential surface of the gravure roll 1 and respective cross sections of a mixture layer 3 of an electrode hoop and a porous refractory layer 4 are illustrated. When a plurality of grooves 7a are formed to extend downward from one outer edge of the circumferential surface of the gravure roll 1 to the other outer edge (from top left to bottom right in FIG. 6) and generally in parallel with one another, a coating fluid totally flows from left to right. The coating fluid used in the gravure method is a Newtonian fluid having a low viscosity. Therefore, the resultant porous refractory layer 4 is formed necessarily with a thin part represented as A and a thick part represented as B.

When a thin roll or the like is used, as an object to be coated with a coating fluid, in the gravure method, a porous refractory layer is formed with a continuously extending thick part. This deforms the roll when the object coated with the coating fluid is rolled up again to take the form of rolls.

A coating method in which a porous refractory layer is prevented from being formed with a thick part by changing the angle of inclination of each of grooves only in a region of a gravure roll having a predetermined width from one outer edge of the circumferential surface of the gravure roll has been suggested in Japanese Unexamined Patent Publication No. 11-005052.

SUMMARY OF THE INVENTION

When a porous layer is formed on the outer surface of an electrode hoop, its entire area formed on a part of an electrode hoop to be coated with a coating fluid need be set to have a thickness (for example, 2 µm or more) that does not substantially cause any problem in case of short circuits. However, although the method disclosed in the publication provides the effect of eliminating a thick part of the porous layer, a thin part thereof is still present. Therefore, a new technique for eliminating the thin part has been required.

The present invention is made based on the above-mentioned problem, and its object is to provide a battery that can restrain a thin part from being formed in a porous layer when the porous layer is formed on the outer surface of an electrode hoop by a gravure method and avoid superheat in case of short circuits with high probability.

A method for forming an electrode for a battery includes the step of forming a porous layer on the surface of an electrode hoop formed at its surface with a mixture layer containing an active material. The porous layer is formed in the following manner: A gravure roll formed at its circumferential surface with a plurality of grooves is rotated oppositely to the direction of movement of the electrode hoop while being allowed to abut against the surface of the moving electrode hoop, thereby applying a coating fluid serving as a precursor of the porous layer to the surface of the electrode hoop. A plurality of grooves formed in the circumferential surface of the gravure roll are formed to have any one of the following patterns in order to suppress the formation of a thin part of the porous layer.

(1) The grooves extend in parallel in oblique directions against the direction of rotation of the gravure roll from a generally central line of the circumferential surface to the outer edges of the circumferential surface so as to be arranged in a symmetrical manner relative to the generally central line.

(2) The grooves include first grooves extending in parallel in an oblique direction against the direction of rotation of the gravure roll from the vicinity of one outer edge of the circumferential surface to the other outer edge and second grooves which extend in parallel with the direction of rotation of the gravure roll and are adjacent to the vicinity of said one outer edge of the circumferential surface.

(3) The grooves extend in parallel in an oblique direction against the direction of rotation of the gravure roll from one outer edge of the circumferential surface to the other outer edge. The angle of inclination of each said groove relative to the direction of rotation of the gravure roll falls within the range of 0.05° through 20°.

Provision of grooves having the patterns (1) through (3) described above allows a coating fluid to remain in a part of the porous layer corresponding to a thin part thereof formed by a known gravure method. This can increase the thickness of the thin part to a thickness that does not substantially cause any problem in case of short circuits. In this way, batteries (in particular, nonaqueous electrolyte secondary batteries) with a high level of safety in case of short circuits can be fabricated with stability.

DETAILED DESCRIPTION OF THE INVENTION

Figure 1:
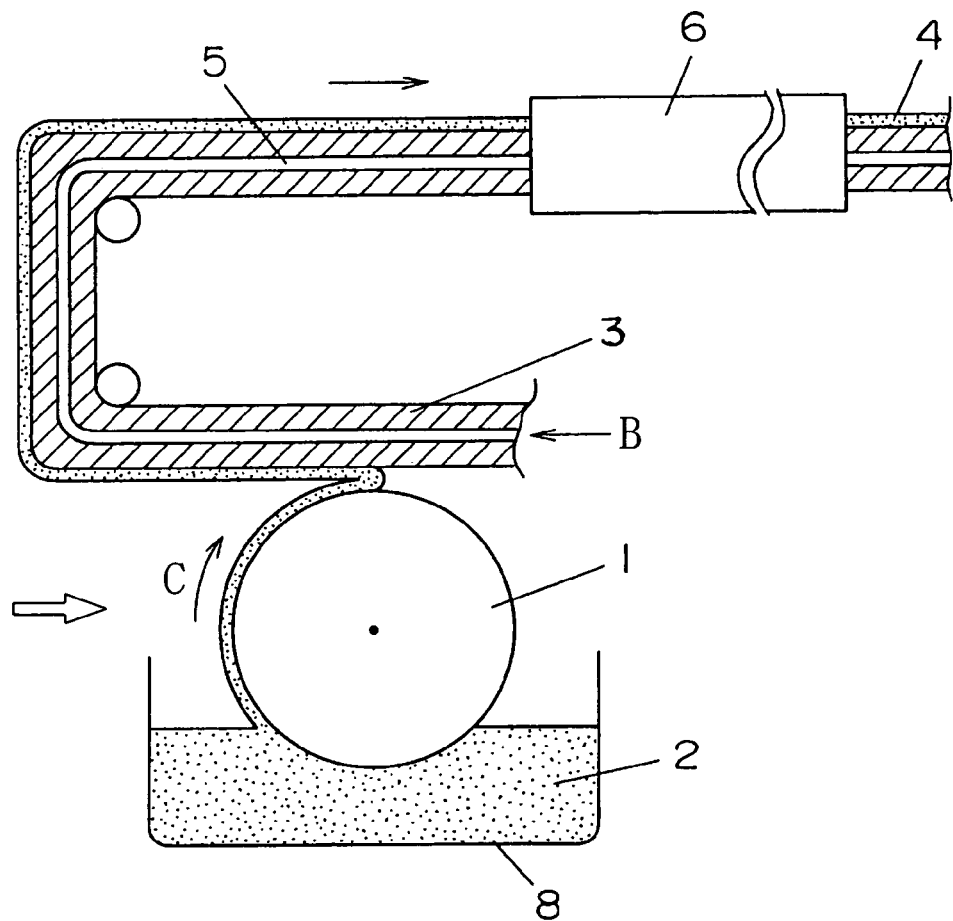
FIG. 1 is a schematic view illustrating a method for forming a porous layer of the present invention.

Embodiments of the present invention will be described hereinafter with reference to the drawings. In the following drawings, components having substantially the same function are denoted by the same reference numerals for simplicity of description. The present invention is not limited to the following embodiments.

Embodiment 1

Figure 2:
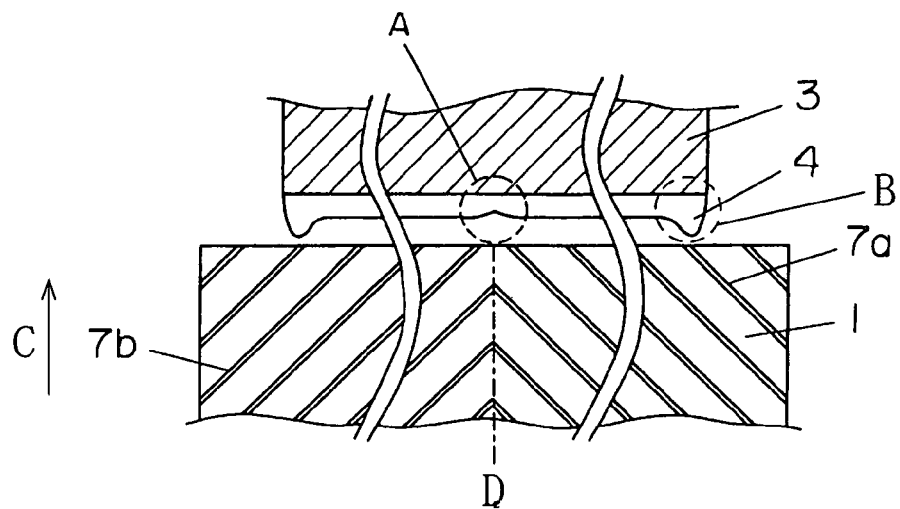
FIG. 2 is a schematic view partially illustrating the state in which a porous layer is formed using a gravure roll according to a first embodiment.

FIGS. 1 and 2 are diagrams for explaining a method for forming an electrode for a battery according to a first embodiment of the present invention and schematic views illustrating the process of forming a porous layer on the outer surface of an electrode hoop.

The method for forming an electrode for a battery according to this embodiment includes the process step of preparing an electrode hoop formed at its surfaces with mixture layers 3 containing an active material and the process step of forming a porous layer 4 on the outer surface of the electrode hoop. The process step of forming the porous layer 4 includes the process step of rotating a gravure roll 1 formed at its circumferential surface with a plurality of grooves oppositely to the direction of movement of the electrode hoop while allowing the gravure roll 1 to abut against the outer surface of the moving electrode hoop (the outer one of the mixture layers 3), thereby applying a coating fluid 2 serving as a precursor of the porous layer 4 to the outer surface of the electrode hoop (the outer one of the mixture layers 3), and the process step of drying the coating fluid 2 applied to the outer surface of the electrode hoop. A plurality of grooves 7a and 7b are formed in the circumferential surface of the gravure roll 1 such that the grooves 7a are generally symmetrical to the grooves 7b with respect to a generally central line D of the circumferential surface thereof. The grooves 7a are formed to extend in parallel in an oblique direction against the direction of rotation of the gravure roll 1 from the generally central line D of the circumferential surface to associated one of both outer edges of the gravure roll 1. The grooves 7b are formed to extend in parallel in an oblique direction against the direction of rotation of the gravure roll 1 from the generally central line D of the circumferential surface to the other one of the outer edges of the gravure roll 1.

More particularly, as illustrated in FIGS. 1 and 2, the electrode hoop in which the mixture layers 3 containing an active material are formed on a core (current collector) 5 is continuously supplied outward from an uncoiler (not shown) also serving as a driver and forced to travel in a specific direction. On the other hand, a coating fluid tank 8 for storing the coating fluid 2 serving as a precursor of the porous layer 4 and the gravure roll 1 formed with one of varying combinations of grooves 7a through 7c that will be described below are placed below the electrode hoop.

The gravure roll 1 is allowed to abut against the outer surface of the electrode hoop (specifically, the outer one of the mixture layers 3) and rotate oppositely (in the direction illustrated by the arrow C in the drawings) to the direction in which the electrode hoop travels (the direction illustrated by the arrow B in FIG. 1). In this way, the coating fluid 2 stored in the coating fluid tank 8 is applied to the outer surface of the electrode hoop along the grooves 7a through 7c. Thereafter, the thickness of a thin part of the porous layer 4 formed through the drying process step using a dryer 6 is increased to a thickness that substantially does not cause any problem in case of short circuits.

FIG. 2 is a schematic view partially illustrating the state in which a porous layer is formed using the gravure roll of the first embodiment. FIG. 2 is a diagram illustrating a gravure roll 1 and its vicinity when perspectively viewed from left to right (as illustrated by the outlined arrow in FIG. 1) and illustrate the circumferential surface of the gravure roll 1 and the respective cross sections of a mixture layer 3 of an electrode hoop and a porous layer 4. As illustrated in FIG. 2, the circumferential surface of the gravure roll 1 is formed with a plurality of grooves 7a and a plurality of grooves 7b extending downward from its generally central line D to associated one of its both outer edges, i.e., in an oblique direction against the direction of rotation of the gravure roll 1, and forming a generally symmetric appearance with respect to the generally central line D. The grooves 7a extend in parallel with one another, and the grooves 7b also extend in parallel with one another.

Figures 5, 6:
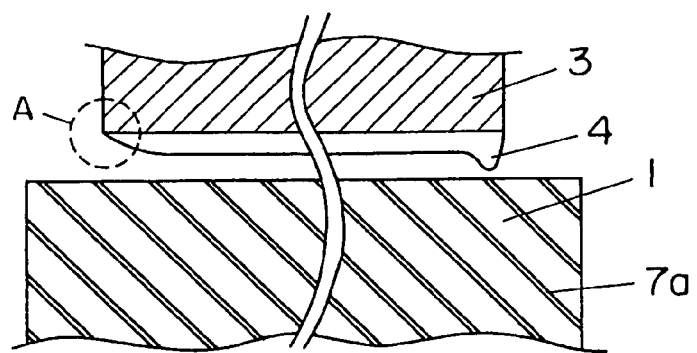
FIG. 5 is a table illustrating the results obtained by measuring variations in the thickness of a thin part of the porous layer of the present invention.
FIG. 6 is a schematic view partially illustrating the state in which a porous layer is formed using a known gravure roll.

A coating fluid 2 supplied along the grooves 7a flows from left to right in the same manner as in FIG. 6. However, a coating fluid 2 supplied along the grooves 7b oppositely flows from right to left. In view of the above, the coating fluid 2 flows from both outer edges of the circumferential surface of the gravure roll 1 to the generally central line D thereof and then from the generally central line D to right and left. This allows a thin part A of a porous layer 4 to move from a part thereof located on one of the lateral ends of a mixture layer 3 to a part thereof opposed to the generally central line D. When the thin part A is thus opposed to the generally central line D, the coating fluid 2 can flow from both lateral sides of the gravure roll 1 onto the thin part A after the application of the coating fluid 2. This provides a leveling effect. Consequently, the thickness of the thin part A can be increased to a thickness that substantially does not cause any problem in case of short circuits.

In this embodiment, the grooves 7a and 7b form a symmetric appearance with respect to the generally central line D of the circumferential surface of the gravure roll 1. However, as long as the leveling effect allows the thin part A to have substantially the same thickness as the other part of the porous layer 4, i.e., to become uniform, the location with respect to which the grooves 7a and 7b form a symmetric appearance does not necessarily have to be the center line D of the circumferential surface. Furthermore, the grooves 7a and 7b do not necessarily form a symmetric appearance. As long as the leveling effect is provided, the angle of inclination of each of the grooves 7a may be different from that of each of the grooves 7b.

Embodiment 2

Figure 3:
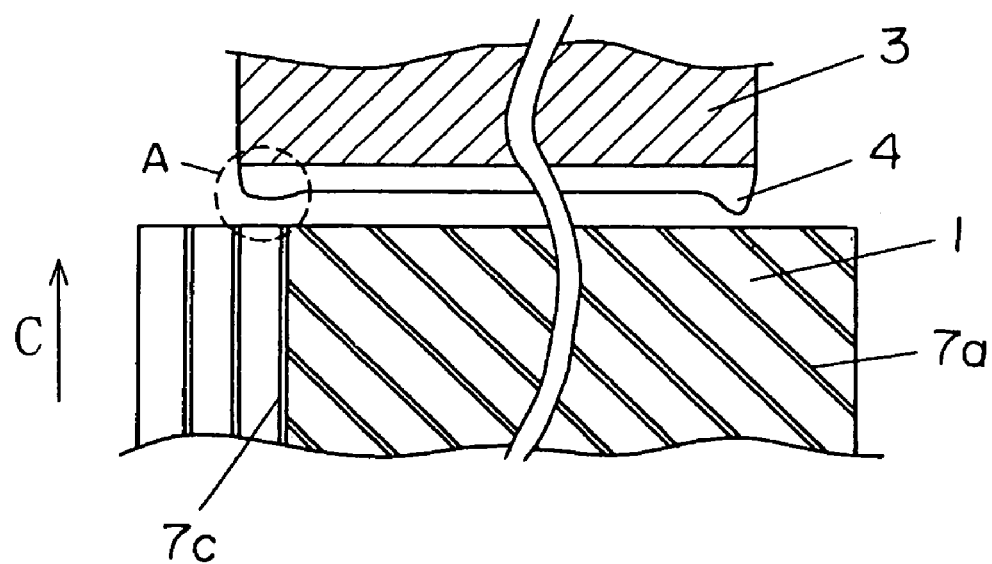
FIG. 3 is a schematic view partially illustrating the state in which a porous layer is formed using a gravure roll according to a second embodiment.

FIG. 3 is a schematic view partially illustrating the state in which a porous refractory layer is formed using a gravure roll according to a second embodiment. As illustrated in FIG. 3, the circumferential surface of a gravure roll 1 is formed with a plurality of first grooves 7a extending in parallel in an oblique direction against the direction C of rotation of the gravure roll 1 from the vicinity of one outer edge of the circumferential surface to the other outer edge and a plurality of second grooves 7c adjacent to one ends of the first grooves 7a and parallel to the direction C. In other words, the plurality of first grooves 7a extend downward from one of the second grooves 7c closest to the center line of the gravure roll 1 to the other outer edge of the circumferential surface and generally in parallel with one another.

When only the first grooves 7a are formed in the circumferential surface of the gravure roll 1, an end part A of a porous refractory layer 4 forms a thin part as illustrated in FIG. 6. However, when a region of the gravure roll 1 located in the vicinity of the end part A is formed with the second grooves 7c extending in parallel with the direction C of rotation of the gravure roll 1, a sufficient amount of the coating fluid 2 can be supplied to the thin part. When only the second grooves 7c are formed in the circumferential surface of the gravure roll 1, the porous refractory layer 4 is formed with irregularities corresponding to the shape of the gravure roll 1 formed with the second grooves 7c. However, the flow of the coating fluid 2 supplied along the first grooves 7a (from left to right) restrains the formation of irregularities. In the above-mentioned manner, the thickness of the thin part can be increased to a thickness that substantially does not cause any problem in case of short circuits.

In this embodiment, the width of a region of the gravure roll 1 in which the second grooves 7c are formed is not particularly limited but, as long as the coating fluid 2 can be sufficiently supplied to the end part A of the porous refractory layer 4, is preferably as narrow as possible in view of the fact that the uniformity of the thickness of the coating fluid 2 formed on the entire surface of the electrode hoop is determined by the first grooves 7a.

Embodiment 3

Figure 4:
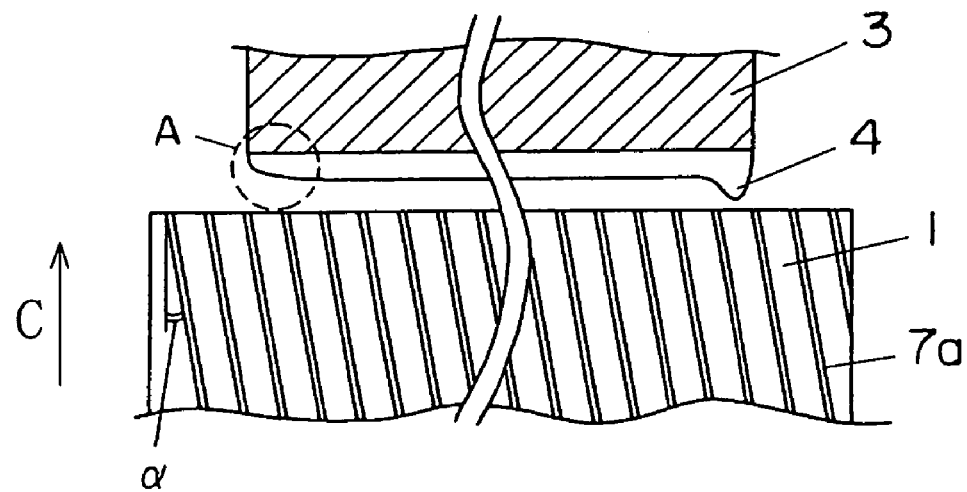
FIG. 4 is a schematic view partially illustrating the state in which a porous layer is formed using a gravure roll according to a third embodiment.

FIG. 4 is a schematic view partially illustrating the state in which a porous refractory layer is formed using a gravure roll according to a third embodiment. As illustrated in FIG. 4, the circumferential surface of the gravure roll 1 is formed with a plurality of grooves 7a extending downward from its one outer edge to the other outer edge, i.e, in an oblique direction against the direction C of rotation of the gravure roll 1 from its one outer edge to the other outer edge. The grooves 7a extend in parallel with one another. The angle α between each groove 7a and the upper edge of the circumferential surface (the angle of inclination of the groove 7a relative to the direction C of rotation of the gravure roll 1) is set within the range of 0.05° through 20°.

When the grooves 7a are formed such that the angle α of inclination becomes 20° or less, this allows a coating fluid 2 to gently move from right to left. Therefore, the thickness of a thin part A of a porous layer 4 can be increased to a thickness that substantially does not cause any problem in case of short circuits. However, when the angle α of inclination is 0.05° or less, irregularities of the porous layer 4 corresponding to the shape of the gravure roll 1 formed with the grooves 7a become noticeable like the case where the gravure roll 1 is formed with grooves extending generally in parallel with the direction C of rotation of the gravure roll 1.

In the first through third embodiments, the grooves 7a through 7c formed in the circumferential surface of the gravure roll 1 preferably each have a width of 0.1 through 0.5 mm and a depth of 0.05 through 0.2 mm from the viewpoint of uniformly spreading out the coating fluid 2 over the outer surface of the outer one of mixture layers 3. The coating fluid 2 is applied to the outer surface of the electrode hoop while the gravure roll 1 is rotated oppositely to the direction in which the electrode hoop travels. However, even when the gravure roll 1 is rotated in the same direction as the direction in which the electrode hoop travels, the effect of the present invention can be achieved.

Embodiment 4

An apparatus for forming an electrode for a battery using the methods for forming an electrode for a battery according to the first through third embodiments can be configured as illustrated in FIG. 1. More particularly, the apparatus includes a first driver (not shown) for allowing an electrode hoop to travel in a specific direction, a coating fluid tank 8 for storing a coating fluid 2 serving as a precursor of a porous layer, a second driver (not shown) for rotating a gravure roll 1 in a specific direction while allowing the gravure roll 1 to abut against the outer surface of the electrode hoop allowed to travel by the first driver, and a dryer 6 for drying the coating fluid 2 applied to the outer surface of the electrode hoop.

The coating fluid 2 stored in the coating fluid tank 8 is applied to the outer surface of the electrode hoop along a plurality of grooves formed in the circumferential surface of the gravure roll 1 that rotates by the second driver. The applied coating fluid 2 is dried by the dryer 6, thereby forming a porous layer 4 on the outer surface of the electrode hoop. The plurality of grooves formed in the circumferential surface of the gravure roll 1 are formed to have any one of the patterns illustrated in FIGS. 2 through 4.

A refractory material having a much higher melting point or thermal decomposition temperature than 200° C. is preferably used as a material of the porous layer 4 of the present invention. More specifically, a refractory resin, such as polytetrafluoroethylene (PTFE), polyimide and polyamide, an inorganic oxide filler, such as alumina and magnesia, or any other material can be used. In order to ensure the adhesion between the porous layer 4 and an electrode to be coated with the porous layer 4, a binder, e.g., polyvinylidene fluoride (PVDF), acrylic rubber particles (for example, BM-500B manufactured by Zeon corporation, Japan) or any other material, is preferably added to the porous layer 4. The binder has the advantages of not only possessing appropriate heat resistance but also holding gaps in the porous layer 4 and thus maintaining the ion conductivity of the porous layer 4 due to reduced electrolyte-swellability. When the coating fluid 2 serving as a precursor of the porous layer 4 is prepared, the above-described material is preferably dispersed or dissolved into a polar organic solvent, such as N-methyl-2-pyrrolidene (NMP).

In a case where an electrode hoop to be coated with the coating fluid 2 is a precursor of a negative electrode of a nonaqueous electrolyte secondary battery, not only a carbonaceous material, such as graphite, but also a high-capacity material containing at least one of elements that can be alloyed with lithium having a theoretical capacitance density of 400 mAh/g or more can be used as an active material. The elements that can be alloyed with lithium include Al, Zn, Ge, Cd, Sn Pb, and any other element. In particular, Si and Sn are preferably used as the elements that can be alloyed with lithium, because use of Si and Sn provides a material in which a large amount of lithium can be stored and Si and Sn are easily available. Various materials, such as a single element, e.g., Si alone or Sn alone, an oxide, e.g., $SiO_x$ ($0<x<2$) or $SnO_x$ ($0<x\leq2$), an alloy containing a transition metal element, e.g., a Ni—Si alloy, a Ti—Si alloy, a Mg—Sn alloy, Fe—Sn alloy, or any other alloy, can be used as the material containing Si or Sn.

In a case where a method in which a particle-like active material is applied onto a core 5 is employed, PVDF, a styrene-butadiene copolymer (SBR), or a modification of acrylic acid based polymer can be used as a binder. In a case where water-based paste is applied, as the binder, to the core 5, use of carboxy methyl cellulose (CMC), polyacrylic acid or any other material as a water soluble thickener increases the stability of the paste. Many of the above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of copper, copper alloy, or any other metal or a porous body (such as lath metal or foam metal) can be used for the core 5.

In a case where an electrode hoop to be coated with the coating fluid 2 is a precursor of a positive electrode of a nonaqueous electrolyte secondary battery, $LiCoO_2$, $LiNi_xCo_yO_2$ ($x+y=1$), or $LiNi_xMn_yCO_zO_2$ ($x+y+z=1$) can be used as an active material. Since a method in which a particle-like active material is applied onto a core 5 is employed, PVDF, PTFE, or any other material can be used as a binder. In a case where water-based paste is applied, as the binder, to the core 5, CMC, polyacrylic acid or any other material can be used for a water soluble thickener. The above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of aluminum, aluminum alloy, nickel, or any other metal or a porous body (such as lath metal or foam metal) can be used for the core 5.

In Examples, the present invention will be described hereinafter in more detail.

Example 1

As illustrated in FIG. 1, a negative electrode hoop in which mixture layers 3 are formed on both surfaces of a core 5 made of 10-μm-thick copper foil to each have a graphite-to-SBR-to-CMC weight ratio of 100:1:1 was wound in a coil form and then attached to an uncoiler also serving as a driver. The negative electrode hoop has a thickness of 150 μm, an active material density of 1.6 g/ml, an overall width of 200 mm. The width of each of the mixture layers 3 is 180 mm, the width of each of exposed parts of the core 5 located to both sides of the mixture layer 3 is 10 mm, and a piece of the negative electrode hoop has a length of 100 m. Meanwhile, a coating fluid 2 in which the weight ratio of alumina (AES-12 manufactured by Sumitomo Chemical Co., Ltd.) to PVDF serving as a binder (#1320 manufactured by Kureha Corporation) to NMP serving as a solvent is 100:42:113 was stored in a coating fluid tank 8. A gravure roll 1 formed at its circumferential surface with grooves 7a and 7b as illustrated in FIG. 2 was placed so as to be partially immersed in the coating fluid 2. The width of the circumferential surface of the gravure roll 1 is 180.5 mm, the diameter of the gravure roll 1 is 120 mm, the width of each of grooves 7a and 7b is 0.2 mm, the depth thereof is 0.1 mm, the distance between adjacent ones of the grooves 7a or 7b is 0.25 mm, and the angle of inclination of each groove 7a or 7b is 45°.

A negative electrode hoop was moved from the uncoiler at a rate of 3 m/min, and the lower one of the mixture layers 3 of the negative electrode hoop was allowed to abut against the top end of the gravure roll 1. Thereafter, the negative electrode hoop is introduced into a dryer 6 (having a length of 2 m) and then dried at a temperature of 120° C. In this way, a porous refractory layer 4 was formed on the outer surface of the outer one of the mixture layers 3 to have an average thickness of 4 μm and again wound in a coil form by a coiler (not shown). The rotational speed of the gravure roll 1 was set at 4 m/min, and the direction of rotation of the gravure roll 1 was set to be opposite to the direction in which the negative electrode hoop travels.

Example 2

In Example 2, the gravure roll 1 of Example 1 was changed to a gravure roll 1 shown in FIG. 3. In Example 2, the width of the circumferential surface of the gravure roll 1 is 180.5 mm, the diameter of the gravure roll 1 is 120 mm, the width of each of grooves 7a and 7c is 0.2 mm, the depth thereof is 0.1 mm, the distance between adjacent ones of the grooves 7a or 7c is 0.25 mm, and the angle of inclination of each groove 7a is 45°. In addition, like Example 1, a porous refractory layer 4 was formed on the outer surface of the outer one of the mixture layers 3 of the negative electrode hoop.

Examples 3 Through 5

In Examples 3 through 5, the gravure roll 1 of Example 1 was changed to a gravure roll 1 shown in FIG. 4. In Examples 3 through 5, the width of the circumferential surface of the gravure roll 1 is 180.5 mm, the diameter of the gravure roll 1 is 120 mm, the width of each of grooves 7a is 0.2 mm, the depth thereof is 0.1 mm, the distance between adjacent ones of the grooves 7a is 0.25 mm, and the angle of inclination of each groove 7a of Example 3 is 0.05°, that of Example 4 is 10°, and that of Example 5 is 20°. In addition, like Example 1, a porous refractory layer 4 was formed on the outer surface of the outer one of the mixture layers 3 of the negative electrode hoop.

Comparative Example 1

In Comparative Example 1, the gravure roll 1 of Example 3 was changed to a gravure roll 1 formed with grooves 7a each having an angle of inclination of 0° and extending in parallel with the direction of rotation of the gravure roll 1. In addition, like Example 3, a porous refractory layer 4 was formed on the outer surface of the outer one of the mixture layers 3 of the negative electrode hoop.

Comparative Example 2

In Comparative Example 2, the gravure roll 1 of Example 3 was changed to a gravure roll 1 formed with grooves 7a having an angle of inclination of 45°. In addition, like Example 3, a porous refractory layer 4 was formed on the outer surface of the outer one of the mixture layers 3 of the negative electrode hoop.

The electrode hoop of each of the above-described examples is uncoiled from the coiler, and then a thin part A of a porous refractory layer 4 formed on an associated mixture layer 3 (in Example 1, a generally central part thereof and in each of other Examples, a left end part thereof) was measured in a generally middle region of a piece of the negative electrode hoop (50 m away from both longitudinal ends of the piece of the negative electrode hoop) in terms of its average thickness and the range of variation in its thickness. To be specific, a part of a piece of a negative electrode hoop corresponding to a thin part A of a porous refractory layer 4 was partially sampled, and the total thickness of the sampled part of the piece of the negative electrode hoop was measured by a microgauge. The thickness of an associated part of the porous refractory layer 4 was determined by subtracting the set thickness of the negative electrode hoop including mixture layers 3 from the measured total thickness. The thickness of a sampled part of a porous refractory layer 4 located in each of the above-mentioned generally middle regions of 30 pieces of the negative electrode hoop was determined in the same manner as described above. Thereafter, the average thickness of the thin part A and the range of variation σ in the thickness thereof were determined.

FIG. 5 is a table illustrating the results. In Comparative Example 1 in which the circumferential surface of a gravure roll 1 is formed with only grooves 7a extending substantially in parallel with the direction of rotation of the gravure roll 1, irregularities of a porous refractory layer 4 corresponding to the shape of the gravure roll 1 formed with the grooves 7a became noticeable. Although the average thickness of the thin part became large, the range of variation in the thickness thereof became large. On the other hand, in Comparative Example 2 in which the circumferential surface of the gravure roll 1 is formed with only grooves 7a extending in substantially the same manner as illustrated in FIG. 6, the thickness of the entire thin part became extremely small as in the known art (the average thickness of the thin part was extremely small).

Unlike Comparative Examples 1 and 2, in Examples 1 through 5, the average thickness of the thin part was also close to the average thickness of the entire porous refractory layer 4, and the range of variation in the thickness of the thin part became small. However, in Example 3, the range of variation in the thickness thereof was slightly larger than that in the other examples, and in Example 5, the average thickness of the thin part was slightly smaller than that in the other examples. It can be seen from the above that the angle of inclination of each groove 7a needs to be 0.05° through 20°.

Although the present invention was described above with reference to the preferred embodiments, the above description is not limited and can be certainly modified in various ways. The type of secondary batteries to which the present invention is applied is not particularly limited, and the present invention can be applied to not only lithium ion secondary batteries but also nickel hydrogen storage batteries and other batteries. Furthermore, also when the present invention is applied to electrochemical elements (e.g., condensers) having the same current-collecting structure as that of the present invention, the same effect can be provided.

What is claimed is:

1. A method for forming an electrode for a battery, said method comprising the steps of:
   preparing an electrode hoop formed at its surface with a mixture layer containing an active material and
   forming a porous layer on the surface of the electrode hoop,
   the step of forming the porous layer comprising the steps of:
   rotating a gravure roll oppositely to the direction of movement of the electrode hoop while allowing the gravure roll to abut against the surface of the moving electrode hoop, thereby applying a coating fluid serving as a precursor of the porous layer to the surface of the electrode hoop, the circumferential surface of the gravure roll being formed with a plurality of grooves, and
   drying the coating fluid applied to the surface of the electrode hoop,
   the grooves extending in parallel in oblique directions against the direction of rotation of the gravure roll from a generally central line of the circumferential surface to the outer edges of the circumferential surface so as to be arranged in a symmetrical manner relative to the generally central line.

2. A method for forming an electrode for a battery, said method comprising the steps of:
   preparing an electrode hoop formed at its surface with a mixture layer containing an active material and
   forming a porous layer on the surface of the electrode hoop,
   the step of forming the porous layer comprising the steps of:
   rotating a gravure roll oppositely to the direction of movement of the electrode hoop while allowing the gravure roll to abut against the surface of the moving electrode hoop, thereby applying a coating fluid serving as a precursor of the porous layer to the surface of the electrode hoop, the circumferential surface of the gravure roll being formed with a plurality of grooves, and
   drying the coating fluid applied to the surface of the electrode hoop,
   the grooves including
   first grooves extending in parallel in an oblique direction against the direction of rotation of the gravure roll from the vicinity of one outer edge of the circumferential surface to the other outer edge, and
   second grooves extending in parallel with the direction of rotation of the gravure roll, said second groove being adjacent to the vicinity of said one outer edge of the circumferential surface.

3. A method for forming an electrode for a battery, said method comprising the steps of:
   preparing an electrode hoop formed at its surface with a mixture layer containing an active material and
   forming a porous layer on the surface of the electrode hoop,
   the step of forming the porous layer comprising the steps of:
   rotating a gravure roll oppositely to the direction of movement of the electrode hoop while allowing the gravure roll to abut against the surface of the moving electrode hoop, thereby applying a coating fluid serving as a precursor of the porous layer to the surface of the electrode hoop, the circumferential surface of the gravure roll being formed with a plurality of grooves, and drying the coating fluid applied to the surface of the electrode hoop, the grooves extending in parallel in an oblique direction against the direction of rotation of the gravure roll from one outer edge of the circumferential surface to the other outer edge, the angle of inclination of each said groove relative to the direction of rotation of the gravure roll falling within the range of 0.05° through 20°.

* * * * *